Figure 1:
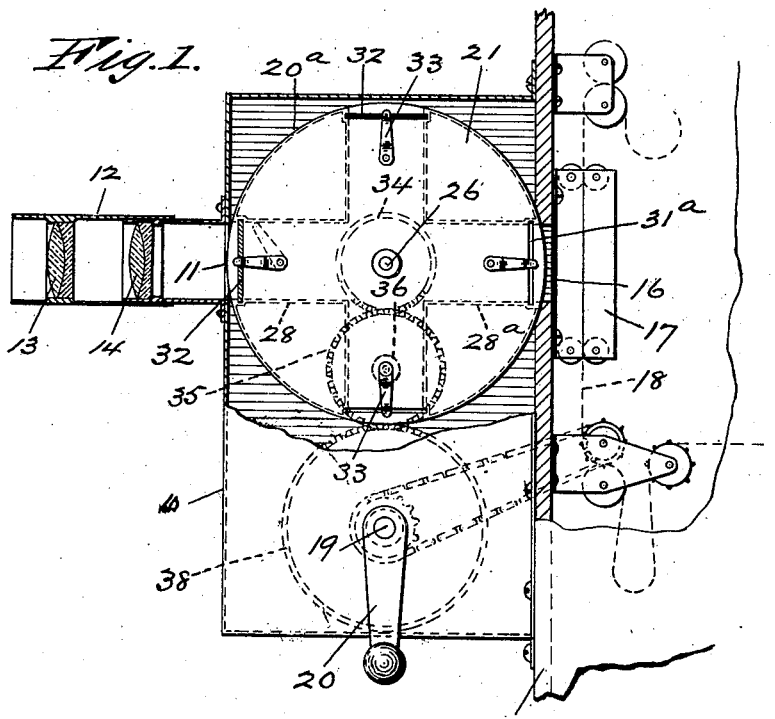

F. W. HOCHSTETTER.
SHUTTER FOR MOVING PICTURE MACHINES.
APPLICATION FILED MAY 21, 1913.

1,137,320.

Patented Apr. 27, 1915.
2 SHEETS—SHEET 1.

Witnesses:
Charles C. Abbe
M. Dumody

Inventor
Frederick W. Hochstetter.
By his Attorney
W. T. Criswell.

F. W. HOCHSTETTER.
SHUTTER FOR MOVING PICTURE MACHINES.
APPLICATION FILED MAY 21, 1913.
1,137,320.
Patented Apr. 27, 1915.
2 SHEETS—SHEET 2.
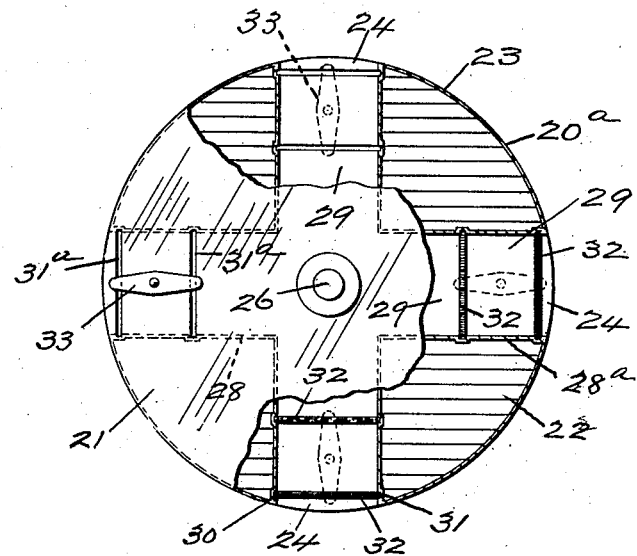
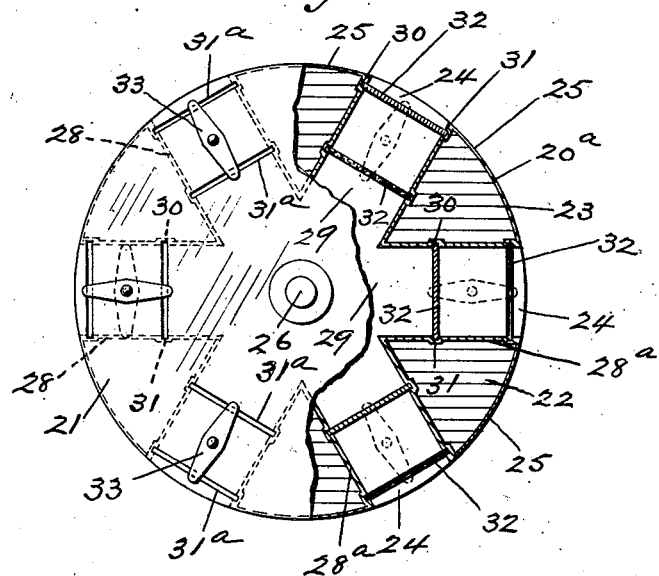

UNITED STATES PATENT OFFICE.

FREDERICK W. HOCHSTETTER, OF NEW YORK, N. Y., ASSIGNOR TO H. P. PATENTS AND PROCESSES COMPANY, INC., A CORPORATION OF NEW YORK.

SHUTTER FOR MOVING-PICTURE MACHINES.

1,137,320.   Specification of Letters Patent.   Patented Apr. 27, 1915.

Application filed May 21, 1913. Serial No. 769,021.

*To all whom it may concern:*

Be it known that I, FREDERICK W. HOCHSTETTER, a subject of the Emperor of Germany, and a resident of New York, county and State of New York, have invented a certain new and useful Improvement in Shutters for Moving-Picture Machines, of which the following is a full, clear, and exact specification.

This invention relates to a class of shutters adapted to be used in conjunction with cameras and projecting apparatus employed for producing and exhibiting moving pictures in colors.

My invention has for its object to simplify the production and exhibition of moving pictures in their natural colors by providing a form of shutter adapted to be utilized in conjunction with the usual or any preferred form of a camera and a projecting apparatus in a manner whereby the pictures may be taken and afterward exhibited without requiring the mechanism of the machine or that of the shutter to be operated at other than normal speed, thus overcoming the necessity for use of apparatus which must be operated at a high speed as is incident to methods ordinarily employed in this art. This is accomplished mainly by providing a drum having tubes disposed diametrically therethrough in a radial, or spoke-fashion to provide exposure passages whereby the entrances to the tubes at the periphery of the drum are spaced apart, and the drum is caused to be rotated across the plane of the exposures of the film when the pictures are taken and when the images are projected so that the light focused through the passages will be intermittently cut-off by the ends of the tubes during their curved downward or upward revolutions. By employing one or more transparent colored plates in the passages when the shutter is used with a camera the natural colors of the objects being photographed will be recorded on the negative film, and the negative is then converted to a positive by the usual means. The shutter with corresponding colored plates are employed in a similar manner in conjunction with a projecting apparatus, and the pictures of the objects will be displayed in their natural colors on a screen.

Another object of the invention is to provide means in each of the tubes of the shutter to permit one, or a number of transparent color plates to be removably held therein.

A further object of the invention is to provide a form of shutter adapted to be conveniently used in conjunction with either a camera, or a projecting apparatus; and still a further object of the invention is to provide means whereby the drum will be rotated at the same speed and in unison with the operation of the camera or projecting apparatus.

With these and other objects in view, the invention will be hereinafter more particularly described with reference to the accompanying drawings, which form a part of this specification, and will be pointed out in the claims at the end of the description.

Figure 2:
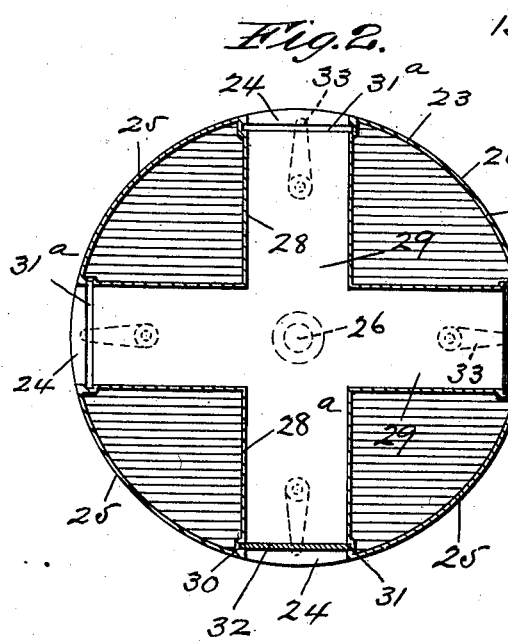
Figure 3:
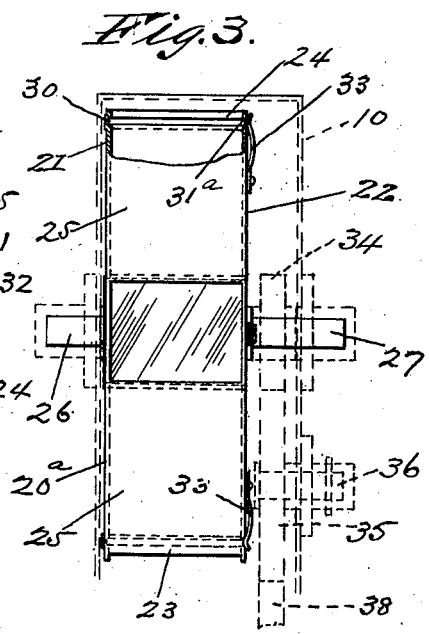

In the drawings, Figure 1 is a fragmentary section, partly in detail, of a form of moving picture camera or projecting apparatus with one form of shutter embodying my invention applied thereto. Fig. 2 is a section through the central part of the drum of the shutter. Fig. 3 is a view, partly broken away, of the edge face of the shutter. Fig. 4 is a side elevation, partly broken away, of the drum of the shutter, and Fig. 5 is a side elevation, partly broken away, of somewhat a different form of the drum.

The shutter is mounted in a casing, as 10, having an aperture 11 through its front wall, and to said casing at this aperture is held one end of a telescopic barrel 12 carrying one or more focusing lenses 13 and 14 of the usual, or any preferred forms. The casing 10 is secured to the front wall 15 having an exposure window 16 of any suitable make of camera, or projecting apparatus adapted to be used for producing the negative plates, or films in photographing scenery, or other objects, or for exhibiting the finished pictures upon a screen. The camera, or projecting apparatus is preferably provided with a suitable framing device, as 17, at its exposure window for yieldingly holding a film, as 18, so as to be intermittently exposed to rays of light projected through the exposure window, and said film may be transmitted successively through the machine by any desired means adapted to be operated by the rotation of a drive shaft 19 which may be driven by a crank handle, as 20.

In the casing 10 is arranged the rotatable shutter proper, and said shutter is preferably in the form of a drum 20ª composed of two parallel spaced side plates 21 and 22 both of which may be circular in shape. At the peripheries of the plates 21 and 22 is an annular band 23 having an equal number of openings 24 therethrough. The openings 24 are spaced at intervals through the band so that the openings of each pair are diametrically opposite to each other, and the portions of the annular band between the openings provide opaque sections, as 25. Extending laterally in opposite directions from the center of the side plates 21 and 22 are studs 26 and 27 which are journaled in bearings provided exteriorly of the side walls of the casing 10. Within the drum 20ª of the shutter are provided pairs of tubes 28 nd 28ª which are in alinement, and the outer end of each of said tubes terminates at the edges of one of the openings 24 of the annular band of the drum. The pairs of the tubes 28 and 28ª are disposed diametrically through the drum so as to be arranged radially, or in spoke-fashion with relation to the axial center of the drum. A continuous passage, as 29, is thereby provided through each pair of the tubes, and while in Figs. 1, 2, 3, 4, I show only two of the passages, it will be understood that forms of the drum may be constructed wherein a greater number of the passages may be used, as illustrated in Fig. 5. By providing this form of the drum 20ª and journaling it in the casing 10, as described, each of the passages 29 is adapted when the drum is rotated to be consecutively registered with the aperture 11 of the casing 10 and the exposure window 16 of the camera whereby the rays of light focused from the lenses 13 and 14 will be intermittenly directed through the passages 29 and through the exposure window upon the film.

The tubes 28 and 28ª are preferably substantially rectangular in shape, and in the inner surface of one of the walls of each of said tubes may be one, or a plurality of transverse grooves, as 30. At corresponding parts of the inner surface of the opposite wall of each of the tubes 28 and 28ª may be a similar number of grooves or slots, as 31, each of which communicates with an opening 31ª through the side plate 21, Fig. 3. When the shutter is employed in conjunction with a camera for recording on a sensitized film the natural colors of the scenery, or objects being photographed, or when the shutter is used in conjunction with a projecting apparatus for exhibiting the pictures in their natural colors, through one, or more of the openings 31ª and into one or more of the grooves 30 and 31 is inserted a transparent plate, or slide of glass, or other material, as 32, each of which is preferably of one of the primary colors. Usually only one of the colored transparent plates is used at one end of each of the passages 29 of the drum so that the opposite end thereof will be open, and in instances a number of the colored transparent plates may be required to accurately record in the photography of the pictures and to exhibit certain color effects upon a screen. Serving as means to removably retain each of the colored transparent plates 32 against accidental displacement in the grooves 30 and 31 of the tubes, exteriorly of the wall of each of the side plates 21 and adjacent to grooves 31 is a clip 33. Each of the clips 33 is in the form of a strip of spring metal, having a part thereof pivoted to the side plate 21 of the drum in a manner whereby the clip may be rotatably moved so that one, or both of its ends will engage the edge of one or more of the colored plates when arranged in the sets of the groves 30 and 31. By reversely swinging one or all of the clips 33 the colored plates may be removed from the tubes, as occasion requires.

For the purpose of rotating the drum 20ª in unison with the operation of the camera, or projecting apparatus, upon the stud 27 of the drum is a gear 34 in mesh with a gear 35 which is freely rotatable upon a short shaft 36 rigidly held in one of the side walls of the casing 10. The gear 35 is in mesh with a drive gear 38 provided on the drive shaft 19. The gears 34, 35, 38 are of relative diameters whereby the drum 20ª will be preferably rotated at a speed equivalent to making sixteen revolutions to one revolution of the drive gear 38. The sensitized film will thereby be more positively affected by the rays of light focused thereon through the colored transparent plates when producing a negative than by driving the shutter at a speed of thirty-two to one as is incident to the methods ordinarily used.

In operating the shutter one or more of the transparent colored plates of suitable primary colors are arranged in each of the passages 29 of the drum 20ª, and when the drive shaft 19 is driven rotation will be imparted through the gears 34, 35, 38 to said drum. The film will be transmitted intermittently through the machine at a corresponding speed. As the drum 20ª is arranged so that its annular band will be revolved in the path of the rays of light focused from the lenses 13 and 14 the intermittent cutting-off of the light directed through the exposure passage 29 will be graduated by the ends of the tubes of the drum during their curved downward or upward revolutions across the rays of the light. The light directed through the transparent color plates will thereby perfectly merge the natural colors of the objects being photographed so as to be accordingly recorded on the sensitized film on a screen.

In the foregoing description I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. In a shutter of the character described, a rotatable drum having a passage extending diametrically therethrough from opposite parts of its peripheral face, said drum being adapted to be disposed so that when rotated in the path of the rays of light its peripheral face will revolve whereby the light focused thereon will be alternately directed through its passage and cut-off during the revolutions of the drum, means provided in the passage of the drum for removably carrying a colored transparent plate therein and means serving to rotate the drum.

2. In a shutter of the character described, a rotatable drum having a plurality of passages extending diametrically therethrough from opposite parts of its peripheral face and disposed in spoke-fashion with relation to the axial center thereof whereby the ends of the passages are spaced apart, said drum being adapted to be disposed so that when rotated in the path of rays of light its peripheral face will revolve whereby the light focused thereon will be directed through the passages and cut-off alternately during the revolutions of the drum, means provided in each passage of the drum for removably carrying a colored transparent plate therein, means provided on the drum at each of its passages for holding each of the transparent plates against displacement, and means serving to rotate the drum.

3. In a shutter of the character described, a plurality of pairs of connected rotatable tubes, each being radially disposed from a common center so that the outer ends thereof are spaced apart, and the tubes of each pair being in alinement whereby a continuous passage is provided therethrough, said tubes being adapted to be disposed so that when rotated in the path of the rays of light the outer ends thereof will revolve whereby the light focused thereon will be directed through the passages and cut-off alternately during the revolutions of the tubes, means provided in each pair of the tubes for removably carrying a transparent plate, a clip on each pair of the tubes for holding the transparent plates against accidental displacement when in the pair of tubes, and means serving to rotate the tubes.

4. In a shutter of the character described, a plurality of pairs of connected rotatable tubes, each being radially disposed from a common center so that the outer ends thereof are spaced apart and the tubes of each pair being in alinement whereby a continuous passage is provided therethrough, said tubes being adapted to be disposed so that when rotated the outer ends thereof will revolve whereby the light focused thereon will be directed through the passages of the tubes and cut-off alternately during the revolution of the tubes, a plurality of colored transparent plates, one being provided in each pair of the tubes to embrace the passage thereof, and means serving to rotate the tubes.

5. In a shutter of the character described, the combination with a moving picture machine which is operated by a drive shaft, of a rotatable drum composed of two spaced parallel circular side plates, an annular band provided around the periphery of the side plates, said annular band having a plurality of spaced openings therethrough, and a plurality of pairs of connected tubes provided between the side plates, said tubes being radially disposed with relation to the axial center of the side plates so that the outer end of each tube communicates with one of the openings of the annular band, and the tubes of each pair being in alinement whereby a continuous passage is provided therethrough, said drum being adapted to be disposed so that when rotated the annular band thereof will revolve whereby the light focused thereon will be directed through the passages of the tubes and cut-off alternately during the revolution of the drum, means provided in each pair of the tubes for removably carrying a number of transparent plates therein, a plurality of clips on each pair of the tubes for holding the transparent plates against accidental displacement when in the tubes, and gearing for imparting rotation to the drum when the drive shaft of the machine is driven.

6. In a shutter of the character described, the combination with a moving picture machine which is operated by the rotation of a drive shaft, of a rotatable drum composed of two spaced parallel circular side plates, an annular band provided around the periphery of the side plates, said annular band having a plurality of spaced openings therethrough and a plurality of pairs of connected tubes between the side plates, said tubes being radially disposed with relation to the axial center of the side plates so that the outer end of each tube communicates with one of the openings of the annular band, and the tubes of each pair being in alinement whereby a continuous passage is provided therethrough, said drum being adapted to be disposed so that when rotated the annular band thereof will revolve whereby the light focused thereon will be directed through the passages of the tubes and cut-off alternately during the revolution of the drum, a plurality of colored transparent plates, one removably held in one of each pair of the tubes, and gearing for imparting rotatation to the drum when the drive shaft of the machine is driven.

This specification signed and witnessed this twentieth day of May A. D. 1913.

FREDERICK W. HOCHSTETTER.

Witnesses:
 ROBT. B. ABBOTT,
 M. DERMODY.